(12) United States Patent
Hanke

(10) Patent No.: US 6,231,900 B1
(45) Date of Patent: May 15, 2001

(54) CONFECTIONERY PRODUCT AND PREPARATION THEREOF

(75) Inventor: Bernhard Hanke, Bad Scwalbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/011,278

(22) PCT Filed: Aug. 9, 1996

(86) PCT No.: PCT/US96/12936

§ 371 Date: Oct. 2, 1998

§ 102(e) Date: Oct. 2, 1998

(87) PCT Pub. No.: WO97/06695

PCT Pub. Date: Feb. 27, 1997

(30) Foreign Application Priority Data

Aug. 19, 1995 (GB) .................................... 9517031

(51) Int. Cl.⁷ ................ A23G 3/00; A23G 3/30; A61K 9/22; A61K 9/30; A61K 9/68
(52) U.S. Cl. .................... 426/96; 424/48; 424/440; 424/441; 426/3; 426/5; 426/289; 426/103; 426/660
(58) Field of Search ............... 426/3, 5, 6, 289, 426/302, 658, 660, 96, 103; 424/48, 439, 440, 441

(56) References Cited

U.S. PATENT DOCUMENTS

| | | | |
|---|---|---|---|
| 4,136,163 | 1/1979 | Watson et al. | 424/54 |
| 4,230,688 | 10/1980 | Rowsell et al. | 424/45 |
| 4,372,942 | 2/1983 | Cimiluca | 424/16 |
| 4,388,328 | * 6/1983 | Glass | 426/3 |
| 4,466,983 | 8/1984 | Cifrese et al. | 426/5 |
| 4,762,719 | * 8/1988 | Forester | 424/440 |
| 4,971,806 | * 11/1990 | Cherukuri et al. | 426/5 |
| 5,002,791 | 3/1991 | Knebl | 426/660 |
| 5,376,389 | * 12/1994 | Reed et al. | 426/5 |
| 5,458,894 | 10/1995 | Knebl et al. | 426/231 |

FOREIGN PATENT DOCUMENTS

| | | |
|---|---|---|
| 0140085 | 9/1984 | (EP) . |
| 0267160 | 5/1985 | (EP) . |
| 0150934 | 8/1985 | (EP) . |
| 0431376 | 11/1990 | (EP) . |
| 1452291 | 8/1973 | (GB) . |

* cited by examiner

Primary Examiner—Arthur L. Corbin
(74) Attorney, Agent, or Firm—Loy M. White; John M. Howell; Karen F. Clark

(57) ABSTRACT

A confectionery product, suitable for the relief of cough and cold like symptoms, includes from about 0.5% to about 80%, by weight, of a coolant composition and from about 20% to about 99.5%, by weight, of a flavour composition in separate, distinct and discrete regions thereof. The coolant and flavour compositions are adapted to provide different release profiles.

17 Claims, No Drawings

CONFECTIONERY PRODUCT AND PREPARATION THEREOF

FIELD OF THE INVENTION

The present invention relates to confectionery products and more particularly to confectionery products having good throat soothing properties and improved taste. The invention further relates to methods for making such products.

BACKGROUND OF THE INVENTION

Coolant materials, especially menthol, have long been known for the soothing of sore throats and the relief of other symptoms of coughs and colds. Often, the material is administered by way of a throat drop or lozenge which releases the active agent upon sucking. The taste of the drop or lozenge may be made more palatable by supplementing the composition with a further flavourant such as a lemon, orange or cherry essence.

EP-A-431,376, for example, discloses hard confections for sustained release treatment of sore throats comprising hydrogenated isomaltulose and an active ingredient which can be an antitussive or antihistamine but can also be menthol or eucalyptus. The confection normally contains a further flavouring agent such as lemon, honey or cherry but which can also be menthol or eucalyptus.

Menthol containing gelatine gums are also known for the same purpose and it has further been recognised in the art that chewing gums can provide useful vehicles for sore throat treatment.

Several other compounds have been reported in the technical literature as having a cooling action similar to menthol. Carboxamides have been disclosed for use in a variety of compositions, including throat drops. Two patents describing such materials and compositions are U.S. Pat. No. 4,136,163, Jan. 23, 1979 to Watson et al. and U.S. Pat. No. 4,230,688, Oct. 28, 1980 to Rowsell et al.

It has now been found, however, that the use of such cooling agents can have a negative impact on flavour, particularly when citrus fruit flavour oils are used. It has further been found though, that the negative interaction can be reduced or even eliminated by incorporating the coolant and flavour into separate compositions within the same product, the compositions being adapted so that the coolant has a different release profile from the flavour.

Multi-component confectionery products are known.

EP-A-150,934, published Aug. 7, 1985, discloses a multi-layered chewing gum composition wherein the separate layers have different gum base content so that they release flavours at different rates. The flavours include orange and lemon oils, cherry essence and peppermint oil.

EP-A-267,160, published May 11, 1988, describes a shaped edible article of at least two discrete body parts joined together in a single compression step. One of the body parts differs from the other in at least one physical and/or chemical property. The article may be used for avoiding flavour-medicinal interactions such as antihistamines with aldehyde containing flavour components.

U.S. Pat. No. 4,762,719, published Aug. 9, 1988, describes a cough drop with a hard candy outer shell and a powdered centrefill. Both the outer shell and the centrefill composition comprise an active ingredient such as menthol and eucalyptus. The shell may further comprise a flavour such as cherry, lemon, orange, lime, etc.

However, none of the above references teach or suggest that there is an advantage to be derived from separating coolants and flavours into distinct compositions adapted so that the coolant has a different release profile from the flavour.

It is accordingly an object of this invention to provide confectionery products having good throat soothing properties and improved taste.

It is a further object of the invention to provide confectionery products comprising both a coolant and a flavour, having improved taste and that is straightforward to manufacture.

SUMMARY OF THE INVENTION

According to one aspect of the present invention there is provided a confectionery product, suitable for the relief of cough and cold like symptoms, comprising a coolant composition and a flavour composition in distinct and discrete regions thereof, the coolant and flavour compositions being adapted to provide different release profiles.

All levels and ratios are by weight, unless otherwise indicated. Percentages are by weight of the finished confectionery product unless otherwise indicated.

DETAILED DESCRIPTION OF THE INVENTION

The present invention provides a confectionery product, suitable for the relief of cough and cold like symptoms, comprising a coolant composition and a flavour composition in distinct and discrete regions thereof, the coolant and flavour compositions being adapted to provide different release profiles. The confectionery product can take various forms including hard and soft candies, chewing gum and pastilles. Preferably, it is a chewable pastille such as a gelatine gum.

At least one region consists of a coolant composition and at least one region consists of a flavour composition. Further regions, comprising neither flavour nor coolant can also be incorporated into the product. Preferably, the confectionery product consists of just one coolant composition and one flavour composition. The distinct and discrete regions can be separate layers, as described, for example, in EP-A-150,934. In which case, preferably the confectionery product is moulded with just two parts, one being the coolant composition, the other the flavour composition. The two parts are preferably, but not necessarily, of approximately equal size.

In an alternatively preferred embodiment the confectionery product can have an outer coating of either the coolant or flavour composition. The coating may be continuous, such as in a centre-filled candy or dragee, or alternatively it can consist of discrete particles such as in a sugar coating.

Coolant Compositions

The coolant composition generally comprises from about 0.5% to about 80%, preferably from about 1% to about 70%, and more preferably from about 5% to about 60% of the total confectionery product. An essential component of the coolant composition is a physiological cooling agent.

A test for physiological cooling agents is described in GB-A-1,452,291, published Oct. 13, 1976, reproduced herein below for convenience.

For the purpose of the present disclosure the following test procedure can be used as a means to identify compounds having a physiological cooling activity and herein referred to as cold receptor stimulants. This test is intended purely as a means for identifying compounds having a physiological cooling agent activity and useful in the present invention and for giving an indication of the different relative activities of the compounds, as between themselves and as compared with menthol, when applied in particular manner to a particular part of the body. The results are not necessarily indicative of the activity of these compounds in other formulations and other parts of the body where other factors come into play. For example, a controlling factor in the onset of cooling effect, its intensity and longevity will be the rate of penetration of the compounds through the epidermis and this will vary in different locations on the human body. The formulation of actual products according to this invention will therefore be done largely on an empirical basis although the test results and other figures given herein will be useful as a guide, particularly in the formulation of products for oral administration, since the test procedure to be described involves oral application of the compound. A similar test may, of course, be devised for the purposes of measuring the relative activities of the compounds of another area of the body, for example, the face or forearm, and this will be a useful guide in the choice of compounds to be used in preparations for external topical usage.

It will also be noted that the described test procedure is done on a statistical basis. This is necessary since sensitivity to these compounds will vary not only from compound to compound and from one part of the body to another, but also from one individual to another. Tests of this nature are commonly used in the testing of the organoleptic properties e.g. taste and smell of organic and inorganic compounds, see Kirk-Othmer: Encyclopedia of Chemical Technology, 2nd Ed. (1967) Vol. 14, pages 336–344.

The following test procedure is aimed at determining the minimum quantity of the test compound required to produce a noticeable cooling effect in a person of average sensitivity, this minimum quantity being termed the threshold for that particular compound. The tests are carried out on a selected panel of 6 people of median sensitivity to l-menthol.

To select a test panel of average sensitivity the following procedure is used. Known quantities of 1-menthol in solution in petroleum ether (bp. 40–60) are placed on 5 mm squares of filter paper, whereafter the solvent is allowed to evaporate. A panel of observers is enrolled and asked to place one impregnated square at a time on the tongue and to report on the presence or absence of a cooling effect. The quantity of l-menthol on each impregnated square is gradually reduced from a value substantially above 0.25 μg. per square to substantially below 0.25 μg, the precise range being immaterial.

Conveniently, one starts with squares containing 2.0 μg being half that of the preceding square, i.e. the second test square will contain 1.0 μg, the third 0.5 μg, and so on. Each quantity is tested on the tongue at least 10 times. In this way, the thresholds to cold receptor stimulus by l-menthol are determined for each individual of the panel, the threshold for each individual being that amount of l-menthol for which, in a series of not less than 10 test applications, a cooling effect is reported 50% of the time. Six panel members are now selected whose threshold to l-menthol is in the range 0 μg to 10 μg and whose average threshold is approximately 0.25 μg, this select panel being regarded as the test panel of average sensitivity.

To test the activity of cooling agents, the above procedure is repeated using only the 6 selected panel members of average sensitivity to l-menthol. The individual thresholds for each test compound on each of the 6 selected panel members are determined and averaged. Those compounds whose average threshold on the select test panel is 100 μg or less, preferably 50 μg or less are regarded as having cooling activity in accordance with this invention.

Physiological cooling agents suitable for use herein include carboxamides, menthol, eucalyptus, menthane esters and menthane ethers, and mixtures thereof.

Suitable menthane ethers for use herein are selected from those with the formula:

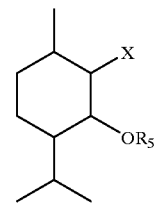

where $R_5$ is an optionally hydroxy substituted aliphatic radical containing up to 25 carbon atoms, preferably up to 5 carbon atoms, and where X is hydrogen or hydroxy, such as those commercially available under the trade name Takasago, from Takasago International Corporation. A particularly preferred cooling agent for use in the compositions of the present invention is Takasago 10 [3-1-menthoxy propan-1,2-diol (MPD)]. MPD is a monoglycerin derivative of 1-menthol and has excellent cooling activity.

The carboxamides found most useful are those described in U.S. Pat. No. 4,136,163, Jan. 23, 1979 to Watson et al., and U.S. Pat. No. 4,230, 688, Oct. 28, 1980 to Rowsell et al.

The carboxamides in U.S. Pat. No. 4,136,163 are N-substituted-p-menthane-3-carboxamides. These compounds are 3-substituted-p-menthanes of the formula:

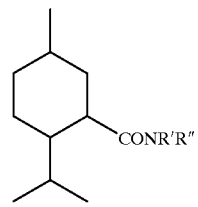

where R', when taken separately, is hydrogen or an aliphatic radical containing up to 25 carbon atoms; R" when taken separately is hydroxy, or an aliphatic radical containing up to 25 carbon atoms, with the proviso that when R' is hydrogen R" may also be an aryl radical of up to 10 carbon atoms and selected from the group consisting of substituted phenyl, phenalkyl or substituted phenalkyl, naphthyl and substituted naphthyl, pyridyl; and R' and R", when taken together with the nitrogen atom to which they are attached, represent a cyclic or heterocyclic group of up to 25 carbon atoms, e.g. piperidino, morpholino etc.

In the above definitions "aliphatic" is intended to include any straight-chained, branched-chained or cyclic radical free or aromatic unsaturation, and thus embraces alkyl, cycloalkyl, alkenyl, cyclo-alkenyl, alkynyl, hydroxyalkyl, acyloxyalkyl, alkoxy, alkoxyalkyl, aminoalkyl, acylaminoalkyl, carboxyall and similar combinations.

Typical values for R' and R" when aliphatic are methyl, ethyl, propyl, butyl, isobutyl, n-decyl, cyclopropyl, cyclohexyl, cyclopentyl, cycloheptylmethyl, 2-hydroxyethyl, 3-hydroxy-n-propyl, 6-hydroxy-n-hexyl, 2-aminoethyl, 2-acetoxyethyl, 2-ethylcarboxyethyl, 4-hydroxybut-2-ynyl, carboxymethyl etc.

When R" is aryl typical values are benzyl, naphthyl, 4-methoxyphenyl, 4-hydroxyphenyl, 4-methylphenyl, 3-hydroxy-4-methylphenyl, 4-fluorophenyl, 4-nitrophenyl, 2-hydroxynaphthyl, pyridyl, etc.

The carboxamides of U.S. Pat. No. 4,230,688 are certain acyclic tertiary and secondary carboxamides. These have the structure

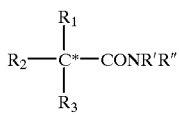

where R' and R", when taken separately, are each hydrogen, $C_1$–$C_5$ alkyl or $C_1$–$C_8$ hydroxyalkyl and provide a total of no more than 8 carbon atoms, with the proviso that when R' is hydrogen R" may also be alkylcarboxyalkyl of up to 6 carbon atoms; R' and R", when taken together, represent an alkylene group of up to 6 carbon atoms, the opposite ends of which group are attached to the amide nitrogen atom thereby to form a nitrogen heterocycle, the carbon chain of which may optionally be interrupted by oxygen;. $R_1$ is hydrogen or $C_1$–$C_5$ alkyl; and $R_2$ and $R_3$ are each $C_1$–$C_5$ alky; with the provisos that (i) $R_1$, $R_2$ and $R_3$ together provide a total of at least 5 carbon atoms, preferably from 5–10 carbon atoms; and (ii) when $R_1$ is hydrogen, $R_2$ is $C_2$–$C_5$ alkyl and $R_3$ is $C_3$–$C_5$ alkyl and at least one of $R_2$ and $R_3$ is branched, preferably in an alpha or beta position relative to the carbon atom marked (*) in the formula.

Suitable menthane esters for use herein are selected from those with the formula:

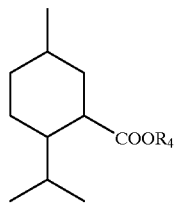

where $R_4$ is hydrogen, hydroxy or an aliphatic radical containing up to 25 carbon atoms.

The physiological cooling agent is preferably present in an amount of from about 0.01% to about 15%, more preferably from about 0.1% to about 12%, most preferably from about 0.5% to about 10% by weight of the coolant composition.

The cooling compositions of the present invention are preferably free of flavouring agents as defined below. The cooling compositions can, however, comprise other agents such as carriers, colourants and the like known to act as flavour modifiers but which are not in themselves essential flavouring ingredients. The compositions can also contain minor levels of low intensity flavouring agents (i.e. agents other than flavour essences and their synthetic equivalents). Carriers for the cooling compositions are chosen according to the particular form the confectionery products take. The confectionery products herein are preferably in the form of lozenges or pastilles. In the case of lozenges or pastilles, the carrier is a sugar or sugar-free base. Sugar-free lozenge compositions are substantially free of saccharose components such as sucrose, fructose etc. while the sugar-based lozenge compositions contain a natural sugar such as sucrose, glucose, fructose, high fructose corn syrup and invert sugar.

In one preferred embodiment, the cooling composition comprises a carrier composition substantially similar to those known in the art for throat gums and pastilles. Suitable carrier compositions can be found in "Skuse's Complete Confectioner", 13th Edition, 1957, published by W. J. Bush & Company Ltd. In such cases the carrier composition comprises a gelling agent such as gelatin, (e.g. Gelatin 220 Bloom) or gum arabic and an acidulating agent. The acidulating agent is generally an organic acid, such as tartaric acid or, preferably, citric acid. The precise level will depend on the raw materials used and the consistency required. Suitable levels are from about 0.3% to about 1.5%, preferably from about 0.4% to about 1.3%, more preferably from about 0.5% to about 1.2% by weight of the cooling composition. Varying the level of the acidulating agent allows control of the dissolution/disintegration rate of the cooling composition and permits differentiation of the release profile of the cooling agent relative to that of the flavour from the flavour composition. The cooling agent is incorporated into the cooling composition using methods well known in the art. Suitable levels of cooling agent in such a composition are from about 0.01% to about 0.5%, more preferably from about 0.05% to about 0.2%, most preferably from about 0.1% to about 0.15% by weight of the coolant composition.

The carrier for the cooling composition can also be a chewing gum composition. Such compositions are well known in the art. they generally comprise a chewing gum base composition including an elastomer or elastomer mixture. Illustrative elastomers include SBR, synthetic gums or elastomers such as polyisobutylene and isobutylene-isoprene copolymers; natural gums or elastomers such as chicle, natural rubber, jelutong, balata, guttapercha, lechi caspi, sorva and mixtures thereof. Gum bases are commercially available. The type and level of gum base within the chewing gum composition can be varied to tailor the release rate of the cooling agent from the cooling composition as described in EP-A-150,934. The cooling agent is incorporated into the cooling composition using methods well known in the art. Suitable levels of cooling agent in such a composition are from about 0.01% to about 0.5%, more preferably from about 0.05% to about 0.2%, most preferably from about 0.1% to about 0.15% by weight of the coolant composition.

In the afore-mentioned cases the cooling composition itself generally comprises from about 20% to about 80%, preferably from about 30% to about 70%, more preferably from about 40% to about 60% by weight of the confectionery product.

In an alternatively preferred embodiment, the cooling composition takes the form of a crystalline coating on the bulk of the pastille, lozenge or gum. In such case the carrier is a crystalline sugar, preferably sucrose, or sugar-free substitute such as sorbitol or xylitol. The crystalline carrier can be loaded with the cooling agent by spray-drying the cooling agent from ethanolic solution onto the crystalline carrier using conventional techniques. Where this type of cooling composition is used, the level of cooling agent can be rather higher than before, from about 0.05% to about 1%, more preferably from about 0.1% to about 0.8%, most preferably from about 0.2% to about 0.6% by weight of the coolant composition. The cooling composition itself in such a case comprises from about 0.5% to about 20%, preferably from about 1% to about 15%, more preferably from about 5% to about 12% by weight of the confectionery product.

Flavour Compositions

The flavour composition generally comprises from about 20% to about 99.5%, preferably from about 30% to about 99%, and more preferably from about 40% to about 95% of the total confectionery product. An essential component of the flavour composition is a flavouring agent.

As used herein, the term 'flavouring agent' means those flavour essences and equivalent synthetic ingredients which are added to the flavour composition for the principal purpose of providing flavour to the confectionery product. It excludes cooling agents as described above. More especially, the term 'flavouring agent' excludes carboxamides, menthol, eucalyptus, menthane esters and menthane ethers. Flavouring agents well known in the confectionery art can be added to the flavour compositions of the invention. These flavouring agents can be chosen from synthetic flavouring liquid and/or oils derived from plants leaves, flowers, fruits and so forth, and combinations thereof. Representative flavouring liquids include: cinnamon oil, artificial, natural or synthetic fruit flavours such as citrus oil including lemon, orange, banana, grape, lime, apricot and grapefruit and fruit essences including apple, strawberry, cherry, orange, pineapple and so forth, bean and nut derived flavours such as coffee, cocoa, cola, peanut, almond and so forth. Preferred flavouring agents are chosen from natural or synthetic fruit flavours such as citrus oil including lemon, orange, lime, and grapefruit and fruit essences including apple, strawberry, cherry, orange, pineapple and so forth.

The amount of flavouring agent employed is normally a matter of preference subject to such factors as flavour type, base type and strength desired. In general, amounts up to about 4% by weight and preferably from about 0.1% to about 3.0% by weight of the flavour composition are usable with amounts of about 0.4% to about 1.5% being preferred.

The flavour compositions of the present invention are essentially free of cooling agents as defined above. The flavour compositions do, however, comprise a carrier, chosen according to the particular form the products take. The carrier is typically of the same form and general composition as the cooling composition carriers described above. It can also take the form of a crystalline coating on the bulk of the pastille, lozenge or gum. In such case the carrier is a crystalline sugar, preferably sucrose, or sugar-free substitute such as sorbitol or xylitol. The crystalline carrier can be loaded with the flavouring agent by spray-drying the flavouring agent from ethanolic solution onto the crystalline carrier using conventional techniques. Where this type of flavour composition is used, amounts of flavouring agent up to about 8% by weight and preferably from about 0.3% to about 5.0% by weight of the flavour composition are usable with amounts of about 0.5% to about 3% being preferred. The flavour composition itself in such a case comprises from about 0.5% to about 20%, preferably from about 1% to about 15%, more preferably from about 5% to about 12% by weight of the confectionery product.

Coolant and Flavour Release Profiles

An essential feature of the present invention is that the coolant and flavour compositions are adapted to provide different release profiles. As used herein, 'adapted to provide different release profiles' means that the compositions are chemically and/or physically modified relative to a homogeneous mix of the compositions, in order that the person ingesting the confectionery product perceives the maximum effect of the cooling agent at a different point in time to the peak sensation of flavour. It will be understood that most such compositions will release the flavour or cooling agent over the period of ingestion of the product and that there may be some simultaneous perception of flavouring agent and cooling agent. By positively separating the peak effects of cooling agent and flavouring agent, however, the overall organoleptic effect of the product is substantially improved versus the compositions of the prior art which are not adapted to provide different release profiles. In preferred embodiments the flavouring agent and cooling agent are released substantially sequentially.

Where the confectionery product takes the form of a gelatine or gum arabic pastille, and the flavour and coolant compositions have substantially the same carrier, the compositions can be adapted to provide different release profiles by using different levels of acidulating agent in the flavour and coolant compositions. The level of acidulating agent controls the solubility and disintegration rate of the composition, higher levels of acidulating agent give a composition which disintegrates more rapidly in the mouth resulting in earlier release of the flavour or coolant. The ratio of the level of acidulating agent by percent weight of the flavour composition to the level of acidulating agent by percent weight of the coolant composition differs from unity preferably by a factor of at least 1.2, more preferably by at least 1.5, especially by at least 1.8. The level of acidulating agent by percent weight of the flavour composition may be greater or lesser than the level of acidulating agent by percent weight of the coolant composition, preferably it is greater. In one embodiment, the ratio of the level of acidulating agent by percent weight of the flavour composition to the level of acidulating agent by percent weight of the coolant composition differs from unity by a factor of at least 0.2, preferably at least 0.5, more preferably at least 0.8.

Where the confectionery product takes the form of a chewing gum, and the flavour and coolant compositions have substantially the same carrier, the compositions can be adapted to provide different release profiles by using different levels of gum base in the flavour and coolant compositions. The level of gum base by percent weight of the flavour composition differs from the level of gum base by percent weight of the coolant composition preferably by at least 4 percentage points, more preferably by at least 6 percentage points, especially by at least 8 percentage points. The level of gum base by percent weight of the flavour composition may be greater or lesser than the level of gum base by percent weight of the coolant composition.

In preferred embodiments, the confectionery product takes the form of a pastille or chewing gum body, comprising only a flavour or cooling composition, to which a crystalline coating of the other of the flavour or cooling composition has been applied. The crystalline flavour or cooling compositions are described above. In such cases the crystalline coating dissolves very much faster than the pastille or gum body releasing the cooling or flavouring agent substantially before the release of the flavouring or cooling agent from the gum or pastille body. Preferably, the pastille or gum body comprises only a flavour composition and the crystalline coating comprises only a cooling composition.

Similar effects may be achieved by using centre-filled candies wherein the confectionery product comprises a powdered filling of the flavour or cooling composition and the hard candy coat comprises the other of the flavour or cooling composition.

It will readily be understood that the techniques described above can be extended to create confectionery products comprising multiple cooling and/or flavour compositions wherein sequential release of several different flavouring or cooling agents may be achieved.

Manufacturing Methods

The present invention also relates to methods of manufacturing the confectionery products described above.

The general techniques for manufacturing confectionery products of the type described herein can be found in "Skuse's Complete Confectioner", 13th Edition, 1957, published by W. J. Bush & Company Ltd, referred to above. A more up to date source giving fuller detail of suitable equipment is the "Silesia Confiserie Manual No. 3", published by Silesia-Essenzenfabrik Gerhard Hanke K. G., Abt. Fachbücherei.

For making the gelatine or gum arabic pastilles with different coolant and flavour release profiles referred to above an illustrative process is as follows.

A gelatine premix is prepared by mixing 13.5 parts water (at a temperature of about 98° C.) with 7.1 parts Gelatine 220 Bloom for a period of about 3 to about 5 minutes and leaving the solution to swell for a period of about 10 to about 15 minutes. The mixing temperature is preferably maintained in the range from about 70° C. to about 80° C. To this mixture is added, with stirring, a further 8.8 parts water, 26.1 parts sucrose and 44.5 parts glucose syrup. Stirring is continued for about a further 2 to 3 minutes. The resulting mix is then heated further to about 105° C. to dissolve any remaining sucrose and then vacuum expanded resulting in a temperature decrease from about 105° C. to about 70° C. and a water loss of about 2 to about 3% to give a sweetened gelatin mixture. In a conventional process, at this stage the cooling, flavouring and acidulating agents would be added and the liquid mass poured into moulds. To achieve the different compositions and release profiles of the confectionery products of the invention, however, the process must be modified at this stage.

For one embodiment, the sweetened gelatin mixture is divided into two. To 99 parts of the first part of the mixture is added 0.2 parts colour, 0.1 parts cooling agent and 0.7 parts acidulating agent (46% citric acid solution). This forms the cooling composition. To 97.8 parts of the second part of the mixture is added 0.2 parts colour, 0.6 parts flavouring agent and 1.4 parts acidulating agent (46% citric acid solution). This forms the flavour composition. The cooling and flavour compositions are then simultaneously injected into common starch moulds so that one end of each mould is filled by the flavour composition and one end by the cooling composition. After drying for a period of about 48 hours at a temperature in the range from about 25° C. to about 30° C., the pastilles are turned out of the moulds, oiled in a drum in a conventional manner to prevent sticking, and packed.

In an alternative embodiment, the process for making the confectionery product includes the step of coating a gum or pastille body with a flavour or cooling composition as described above. Thus, for example, the flavour composition is formed as described above and then poured into starch moulds so that the whole mould is filled by the flavour composition. After drying and turning out as above the pastilles are treated with steam to soften the surface and then tumbled in a drum with a cooling agent treated sugar crystals which adhere to the softened pastille surface. The amount of the cooling composition picked up will vary according to the size and geometry of the pastille but will typically be in the range from about 5% to about 15% of the finished pastille.

The following examples are given to illustrate the compositions according to the invention. However, the invention is not limited thereto.

EXAMPLE 1

Medicinal pastille confectionery products according to the invention are prepared as follows. A sweetened gelatin mixture, is prepared as described above, with the following composition. Percentages are by weight of the sweetened gelatin mixture.

|  | % |
|---|---|
| Gelatine 220 Bloom | 7.1 |
| Sucrose | 26.1 |
| Glucose syrup (50 DE) | 44.6 |
| Water | 22.2 |

Utilising the common sweetened gelatin mixture, flavour and coolant compositions, A and B are prepared having the following compositions. Percentages are by weight of the flavour and coolant compositions respectively.

|  | A % | B % |
|---|---|---|
| Sweetened gelatin mixture | 97.8 | 99.0 |
| Citric acid solution (46%) | 1.4 | 0.7 |
| Colourant | 0.2 | 0.2 |
| Menthol | — | 0.1 |
| Orange flavour | 0.6 | — |

Starch moulds are then simultaneously injected with each of the flavour and coolant compositions. Equal volumes of each filling opposed ends of the mould and meeting at the middle so that composite gelatine based pastilles are formed with one end of the pastille comprising the flavour composition and the other comprising the coolant composition. The pastilles are turned out of the moulds and oiled lightly to prevent sticking. The ratio of citric acid by percent weight of the flavour composition (A), to the level of citric acid by percent weight of the coolant composition (B), is 2:1. The higher acidification of the flavour composition results in earlier release of the flavour than of the menthol.

EXAMPLE 2

A second form of medicinal pastille confectionery product according to the invention is prepared starting with the sweetened gelatin mixture of Example 1. Percentages are by weight of the finished confectionery product.

|  | % |
|---|---|
| Sweetened gelatin mixture[1] | 88.53 |
| Citric acid solution (46%) | 1.91 |
| Colourant | 0.32 |
| Cherry essence | 0.13 |
| Mentholated sucrose[2] | 9.11 |

[1]From Example 1 above
[2]Aroma Zucker C 94150D coatec - Carries 0.4% menthol

The sweetened gelatin mixture, citric acid solution, colourant and cherry essence are mixed together at a temperature in the range from about 64° C. to about 66° C. and the resulting mixture is poured into moulds. After drying for a period of about 48 hours, the moulded pastilles are turned out of the moulds and treated with steam to soften the surface. The softened pastilles (comprising the flavour composition) are then tumbled in a drum containing the mentholated sugar (the coolant composition) which adheres to the surface of the pastilles. Upon sucking the pastilles, the coolant composition releases the menthol cooling agent earlier than the release of the flavour.

The confectionery products of the invention have good throat soothing properties and improved taste.

What is claimed is:

1. A pastille confectionery product, suitable for the relief of cough and cold symptoms, comprising from about 0.5% to about 80%, by weight, of a coolant composition and from about 20% to about 99.5%, by weight, of a flavour composition each composition being in separate, distinct and discrete regions of the product, the coolant and flavour compositions being adapted to provide different release profiles; wherein the coolant composition is free of flavouring agents and the flavour composition is essentially free of cooling agents.

2. A product according to claim 1 wherein the flavour or coolant composition is in the form of discrete crystals applied as a coating to the pastille comprising the other of the flavour or coolant composition.

3. A product according to claim 1 wherein the product consists of one coolant composition and one flavour composition.

4. A product according to claim 3 wherein each of the coolant and flavour compositions comprises a gelatin or gum arabic gelling agent and an acidulating agent.

5. A product according to claim 4 wherein the ratio of the level of acidulating agent by percent weight of the flavour composition to the level of acidulating agent by percent weight of the coolant composition differs from unity by a factor of at least 0.2.

6. A product according to claim 5 wherein the ratio of the level of acidulating agent by percent weight of the flavour composition to the level of acidulating agent by percent weight of the coolant composition differs from unity by a factor of at least 0.5.

7. A product according to claim 6 wherein the ratio of the level of acidulating agent by percent weight of the flavour composition to the level of acidulating agent by percent weight of the coolant composition differs from unity by a factor of at least 0.8.

8. A pastille confectionary product comprising:
   a. from about 0.5% to about 80%, by weight, coolant composition, wherein the coolant composition comprises a cooling agent selected from the group consisting of carboxamides, menthane esters, menthane ethers and mixtures thereof, and
   b. flavour composition;
   wherein the coolant composition is free of flavouring agents and the flavour composition is essentially free of cooling agents, and further wherein the coolant composition and flavour composition are adapted to provide different release profiles and are located in separate, distinct and discrete regions of the pastille confectionery product.

9. A confectionery product according to claim 8, wherein the coolant composition comprises, by weight of the coolant composition, from about 0.3% to about 1.5% of an acidulating agent and from about 0.01% to about 0.5% of a cooling agent.

10. A confectionery product according to claim 8, wherein the coolant composition comprises, by weight of the coolant composition, from about 0.01% to about 0.5% of a cooling agent.

11. A confectionery product according to claim 8, wherein the confectionery product comprises from about 0.5% to about 20%, by weight, coolant composition, and further wherein the coolant composition is in the form of a crystalline coating comprising from about 0.05% to about 1%, by weight of the coolant composition, cooling agent.

12. A confectionery product according to claim 8, wherein the confectionery product comprises from about 0.5% to about 20%, by weight, flavour composition, and further wherein the flavour composition is in the form of a crystalline coating comprising up to about 8%, by weight of the flavour composition, flavouring agent.

13. A method of reducing the negative interaction between cooling agents and flavouring agents in a pastille confectionery product, comprising the step of preparing a pastille confectionery product comprising a flavour composition and from about 0.5% to about 80%, by weight of the confectionery product, coolant composition;

wherein the coolant composition and the flavour composition are adapted to provide different release profiles and are located in separate, distinct and discrete regions of the pastille confectionery product.

14. A method according to claim 13, wherein the flavour composition comprises a citrus fruit flavour oil.

15. A method according to claim 14, wherein the coolant composition is free of flavouring agents and the flavour composition is essentially free of cooling agents.

16. A method according to claim 15, wherein the flavour composition further comprises acidulating agent and the coolant composition further comprises acidulating agent, and further wherein the ratio of the level of acidulating agent by percent weight of the flavour composition to the level of acidulating agent by percent weight of the coolant composition differs from unity by a factor of at least 0.2.

17. A method according to claim 13, wherein the pastille confectionery product comprises from about 0.5% to about 20%, by weight of the pastille confectionery product, of a coolant composition in the form of a crystalline coating comprising from about 0.05% to about 1%, by weight, cooling agent.

* * * * *